United States Patent [19]

Polkinghorne

[11] Patent Number: 5,092,815
[45] Date of Patent: Mar. 3, 1992

[54] METHOD AND APPARATUS FOR CUTTING POULTRY HIND QUARTERS

[75] Inventor: Robert F. Polkinghorne, Jonesboro, Ga.

[73] Assignee: Starflex Corporation, College Park, Ga.

[21] Appl. No.: 472,013

[22] Filed: Jan. 30, 1990

[51] Int. Cl.⁵ .................. A22C 25/18; A22C 15/00
[52] U.S. Cl. ................................. 452/179; 452/153; 452/163; 452/167
[58] Field of Search ............... 17/52, 44.1, 44.2; 452/149, 150, 153, 155, 160, 163, 167, 179

[56] References Cited

U.S. PATENT DOCUMENTS 3,277,514 10/1966 Hooley .................................. 17/11

FOREIGN PATENT DOCUMENTS 0084918 8/1983 European Pat. Off. ............ 17/11

Primary Examiner—Willis Little
Attorney, Agent, or Firm—Nicholas N. Leach

[57] ABSTRACT

The present invention is directed to an automated poultry processing system having a novel chicken hind quarter cutting stage that does nor require the individual chicken hind quarters to be removed from the moving treadmill before or after halving the chicken hind quarters. Each chicken hind quarter is placed into a moveable shackle including a rotatable shackle assembly. Each rotatable shackle assembly includes a cam plate that, when moved into contact with a stationary cam member, causes the shackle assembly to rotate 90°, thereby rotating the chicken hind quarter by 90°. The chicken hind quarter then moves into contact with a guide member that positions the chicken hind quarter for subsequent cutting by a rotary saw. The chicken hind quarter remains in contact with the guide member until the saw has cut the chicken hind quarter into halves, thereby facilitating a precise cut of the chicken hind quarter. The chicken hing quarter halves, which are still in the moving shackle assemblies, then may proceed to later stages of the poultry processing system.

18 Claims, 4 Drawing Sheets

METHOD AND APPARATUS FOR CUTTING POULTRY HIND QUARTERS

BACKGROUND AND SUMMARY OF THE INVENTION

This invention is directed to automated poultry processing systems. More specifically, this invention is directed to a novel poultry processing machine for cutting poultry or chicken hind quarters into halves.

In conventional automated poultry processing systems, individual chickens are transported through the poultry processing system by moveable shackles or stirrups that are connected to a continuous treadmill. The hocks of each chicken are held in each shackle and the chicken hangs from the shackle with legs upward. As the treadmill moves, the chickens are advanced through various stages of the poultry processing system, such as stages for processing into portions or parts.

As the chicken is directed to portion or parts processing stages, the remaining portion of the chicken, commonly referred to as the hind quarter, remains in place in the moving shackles. The chicken hind quarter consists of the chicken's tail portion and two legs (with feet removed). At this point in conventional poultry processing systems, the chicken hind quarters are manually removed at a cutting stage and cut into halves using leg quarter processors or rotary table saws. The chicken hind quarter halves must then be either dropped onto conveyor belts or packaged. For instance, in poultry processing systems employing automated bagging systems for the hind quarter halves, an operator removes the hind quarters from the shackle line and places them into a leg processor. The automated bagging system receives the hind quarter halves from the leg quarter processor and bags them. It is clear that this cutting stage in existing poultry processing systems suffers from a number of drawbacks.

Because the chicken hind quarters must be manually removed from the moving shackles before being halved, time is lost at this cutting stage, operators are required and there can be cutting errors. Safety to operators at this cutting stage is also a concern.

It is an object, therefore, of the present invention to overcome these obvious drawbacks in existing poultry processing systems.

It is another object of the present invention to provide an improved apparatus and method for cutting chicken hind quarters that can be incorporated into existing poultry processing systems.

It is yet another object of the present invention to provide an improved apparatus and method for cutting chicken hind quarters that allows a high degree of control over the end product to be maintained.

It is still another object of the present invention to provide an improved apparatus and method for cutting chicken hind quarters that is compatible with automated deloading and packaging processors.

The present invention is directed to an automated poultry processing system having a novel chicken hind quarter cutting stage that does not require the individual chicken hind quarters to be removed from the moving treadmill before or after halving the chicken hind quarters. Each chicken hind quarter is placed into a moveable shackle including a rotatable shackle assembly. Each rotatable shackle assembly includes a cam plate that, when moved into contact with a stationary cam member, causes the shackle assembly to rotate 90°, thereby rotating the chicken hind quarter by 90°. The chicken hind quarter then moves into contact with a guide member that positions the chicken hind quarter for subsequent cutting by a rotary saw. The chicken hind quarter remains in contact with the guide member until the saw has cut the chicken hind quarter into halves, thereby facilitating a precise cut of the chicken hind quarter. The chicken hind quarter halves, which are still in the moving shackle assemblies, then may proceed to later stages of the poultry processing system.

In a further aspect of the invention, the chicken hind quarter cutting stage further includes a second cam member that rotates the rotatable shackle assemblies back 90° to their original positions upon exiting this stage of the poultry processing system.

BRIEF DESCRIPTION OF THE DRAWINGS

The present invention will be described in further detail with reference to the accompanying drawings.

DETAILED DESCRIPTION OF PREFERRED EMBODIMENT

Figure 1:
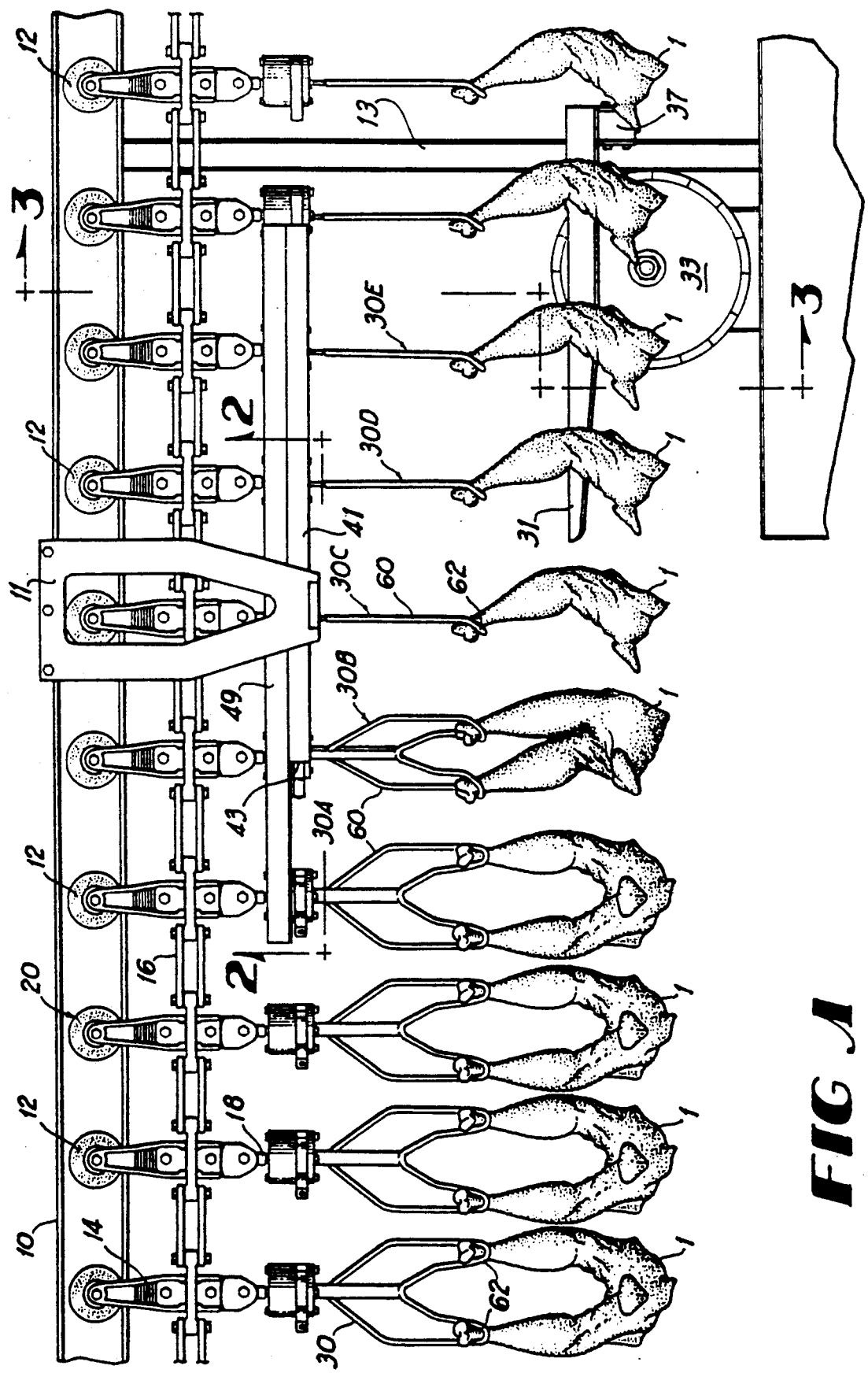
FIG. 1 is a side elevational view of a preferred embodiment of the present invention.
Figure 3:
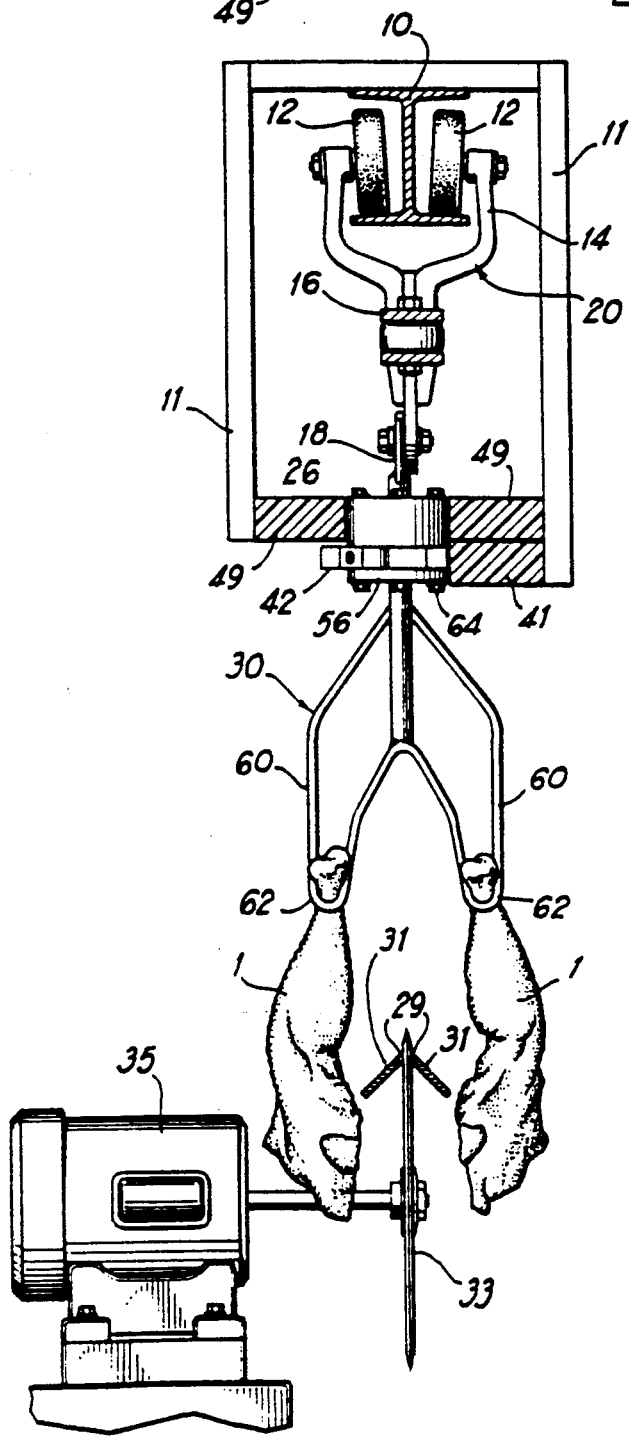
FIG. 3 is a sectional view of the embodiment of FIG. 1 taken along line 3—3 of FIG. 1.

In FIG. 1, there is shown a cutting stage of an automated poultry processing system incorporating the present invention. The poultry processing system includes a stationary treadmill or shackle line 10 that typically is continuous throughout the entire poultry processing plant. As best shown in FIG. 3, the treadmill 10 is of I-beam construction and generally is formed of a rigid material, such as iron or steel.

Again referring to FIGS. 1 and 3, moveable shackles 20 are shown. Each shackle 20 includes a pair of rotatable shackle wheels 12 on each side of the shackle line I-beam 10. The shackle wheel pair 12 is connected to a shackle wheel carriage 14 that is in turn fixedly attached to a shackle chain 16. The shackle chain 16 is connected to a continuous driving means (not shown) of known construction that drives the shackle chain 16 and thereby the attached shackles 20. The shackle wheels 12, shackle wheel carriage 14 and shackle chain 16 are typically formed of a rigid material, such as iron or steel.

The shackle 20 further includes an upper shackle shaft 18 that is fixedly connected on one end to the shackle wheel carriage 14 by conventional means, such as a bolt or screw. The shackle shaft 18 is connected on the other end to the moveable shackle assembly 30, which is described in detail below.

As shown in FIG. 1, the legs of each chicken hind quarter 1 are hung in the shackle holders 62 of the shackle frame 60. As best shown in reference to shackle assembly 30D, the shackle holders 62 of each shackle frame 60 are set at an angle from the vertical portions of the shackle frame 60 to facilitate holding the chicken hind quarters in place, a technique that is known in the art. As the chicken hind quarters 1 enter the cutting stage shown in FIG. 1, the chicken hind quarters are oriented parallel to the direction of motion, which is from left to right in the figure. In order to cut the chicken hind quarters 1 into halves using a rotary saw 33, it is necessary to perform a 90° rotation of the chicken hind quarters 1 to orient the chicken hind quarters 1 perpendicularly to the cutting axis of rotary saw 33.

After each shackle assembly 30 is rotated to the position shown by shackle assembly 30D, the chicken hind quarters 1 advance into contact with a cutting guide 31. As shown in FIG. 1, cutting guide 31 has a rounded and tapered forward end for facilitating gradual positioning of each chicken hind quarter 1 prior to being cut into halves. As shown in FIG. 3, the cutting guide 31 forms an inverted "v", which makes for easier cleaning of residue from the guide surfaces and underside. Guide 31 has a slot 29 through which a portion of rotary saw 33 extends. While the length of slot 29 is not critical, slot 29 must at least allow the proper cutting relationship to be obtained between the rotary saw 33, cutting guide 31 and chicken hind quarters 1 moving through this cutting stage. The width of guide 31 gradually increases to its maximum width at a point preceding the forward cutting edge of rotary saw 33, as shown in reference to shackle assembly 30E. As each chicken hind quarter 1 proceeds into contact with rotary saw 33, the chicken hind quarter 1 also remains in contact with guide member 31. The gradual increase in cutting guide 31 width further serves to stretch each chicken hind quarter 1 into a taut position and stretch the chicken legs apart, thereby enhancing the accuracy of the cut produced by rotary saw 33. As shown in FIG. 3, after the chicken hind quarter 1 has been completely cut into separate halves, the chicken hind quarter halves are no longer necessarily in contact with guide 31, as the positioning and stretching functions of the cutting guide 31 are no longer required. While the configuration of guide 31 shown in FIG. 3 is preferred, other configurations, such as a cylindrical mandrel with a gradually increasing outer diameter, may be advantageously employed.

Since the chicken hind quarter halves 1 remain in the moving shackles 20 after exiting this cutting stage of the poultry processing system, other automated poultry processing stages may be advantageously employed in combination therewith. For example, this cutting stage may be followed by an automated deloading stage, which removes the hind quarter halves 1 from the moving shackles 20, followed by an automated packaging stage, which packages the hind quarter halves 1 into, for instance, into bulk units.

Again referring to FIGS. 1 and 3, guide member 31, rotary saw 33 and a rotary saw motor 35 (of known construction) are mounted on a moveable mounting frame 37 that is attached to a frame 13. The height of mounting frame 37 can be adjusted to compensate for differences in the sizes of chicken hind quarters 1 passing through this cutting stage of the poultry processing system.

In accordance with applicable state and federal regulations, all elements of the present invention coming into physical contact with chicken hind quarters 1, specifically shackle holders 62 of shackle frames 60, guide member 31 and rotary saw 33, are formed of materials approved as food grade by the U.S. Food and Drug Administration. Advantageously, the surfaces of guide 33 may be coated with Teflon ® or another friction-reducing, self-lubricating material to reduce the drag imparted on the chicken hind quarters 1 passing along guide member 33.

Figure 2:
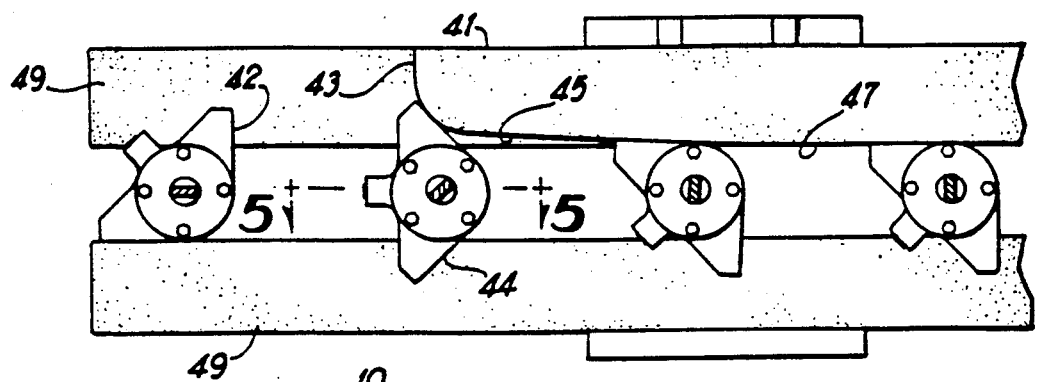
FIG. 2 is a sectional view of the embodiment of FIG. 1 taken along line 2—2 of FIG. 1.

Referring now to FIGS. 1 and 2, rotation of the shackle assemblies 30 will be described. The shackle guide members 49 are fixedly attached to the shackle line I-beam 10 by guide support 11. Shackle guides 49 are positioned parallel to shackle line I-beam 10 and spaced apart to allow shackle assemblies 30 to pass therebetween. The spacing between shackle guides 49, as well as their height in relation to shackle assemblies 30, is determined according to the position of cap 26 of each shackle assembly 30. Preferably, shackle guides 49 form a close fitting relationship with each cap 20 to reduce lateral movement of shackle assemblies 30 in a plane perpendicular to the direction of motion of the shackle assemblies 30, thereby enhancing the accurate positioning of each chicken hind quarter 1 as it advances toward guide member 31 and rotary saw 33. Preferably, shackle guides 49 are sufficiently long to provide the aforementioned positioning function up to the point where the chicken hind quarters 1 have been cut into halves by rotary saw 33. For example, in the embodiment shown in FIG. 1, the right most ends of shackle guides 49 extend to the vertical plane passing through the rotational axis of the rotary saw motor drive shaft.

Beneath one shackle guide 49, a cam member 41 is fixedly attached by conventional means, such as bolts or screws. While in the embodiment shown in FIG. 1, cam member 41 is attached to the forwardmost shackle guide 49, cam member 41 could alternatively be positioned under the rearmost shackle guide 49 without deleterious effect. The forward end 43 of cam member 41 is located in relation to the forward end of shackle guide 49 such that each shackle assembly 30 enters the space between shackle guides 49 prior to coming into contact with cam member 41. Shackle guides 49 also serve to prevent lateral movement of shackle assemblies 30 that would otherwise result from contacting cam member 41.

Forward end 43 of cam member 41 is rounded and is followed by a tapered inner surface 45 that gradually increases in width until the maximum width of cam member 41 is reached at a point preceding the position at which the chicken hind quarter 1 comes into contact with guide member 31. In the embodiment shown in FIG. 1, this point corresponds to the position of shackle assembly 30D.

As each moving shackle 20 advances toward rotary saw 33, a cam plate 40 of shackle assembly 30 contacts the forward end 43 of cam member 41. Specifically, a first cam plate surface 42 of cam plate 40 contacts the forward end 43. As shackle 20 continues to advance, first cam plate surface 42 slides along forward end 43 and inner surface 45 of cam member 41, causing cam plate 40 and the remaining elements of rotatable shackle assembly 30 to rotate about the longitudinal axis of shackle shaft 18. In the embodiment shown in FIG. 1, shackle assembly 30A represents a shackle assembly in an original or first position, not yet having contacted cam member 41. Shackle assemblies 30B and 30C represent a shackle assembly in partially rotated or second positions, cam plates 40 having contacted cam member 41. Shackle assembly 30D represents a shackle assembly in a fully rotated or third position, having advanced past the end of tapered inner surface 45 of cam member 41. The angular positions of cam plate 40 in the original, partially rotated and fully rotated positions described above are shown in FIG. 2. Upon reaching the fully rotated position, first cam plate surface 42 remains in sliding contact with cam member 41 until reaching the end of cam member 41.

In order to facilitate the sliding contact between cap 26 of shackle assembly 30 and shackle guides 49, cap 26 and shackle guides 49 are preferably formed of a friction-reducing, self-lubricating material, such as Teflon ® or nylon. Likewise, cam member 41 is preferably formed of a friction-reducing, self-lubricating material. While in the embodiment described herein, cam plate 40 is formed of a metallic material, such as stainless steel, other suitable rigid materials may be advantageously employed, including Teflon ®.

Figure 4:
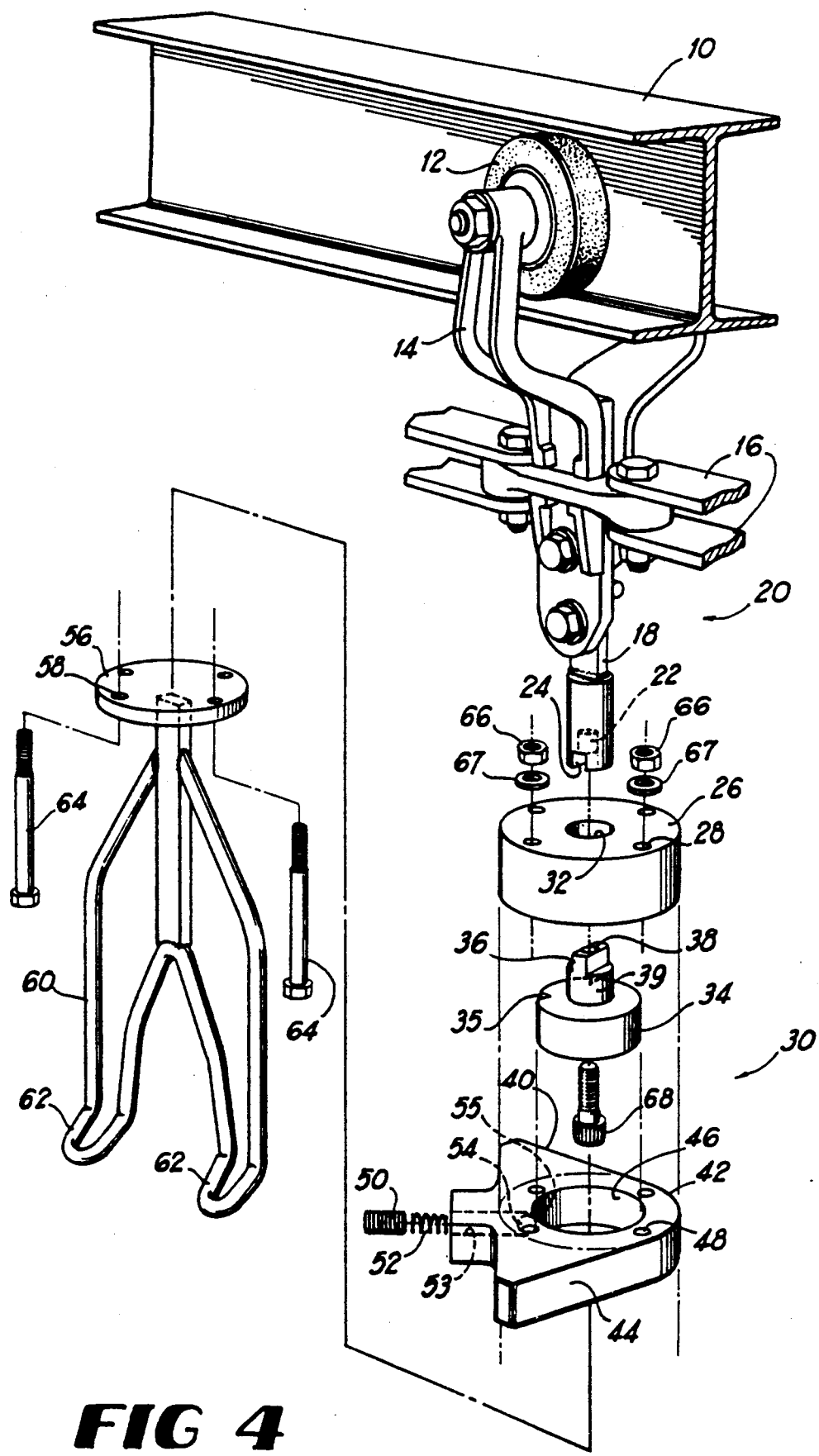
FIG. 4 is an exploded perspective view of the rotatable shackle assembly of the embodiment of FIG. 1.
Figure 5:
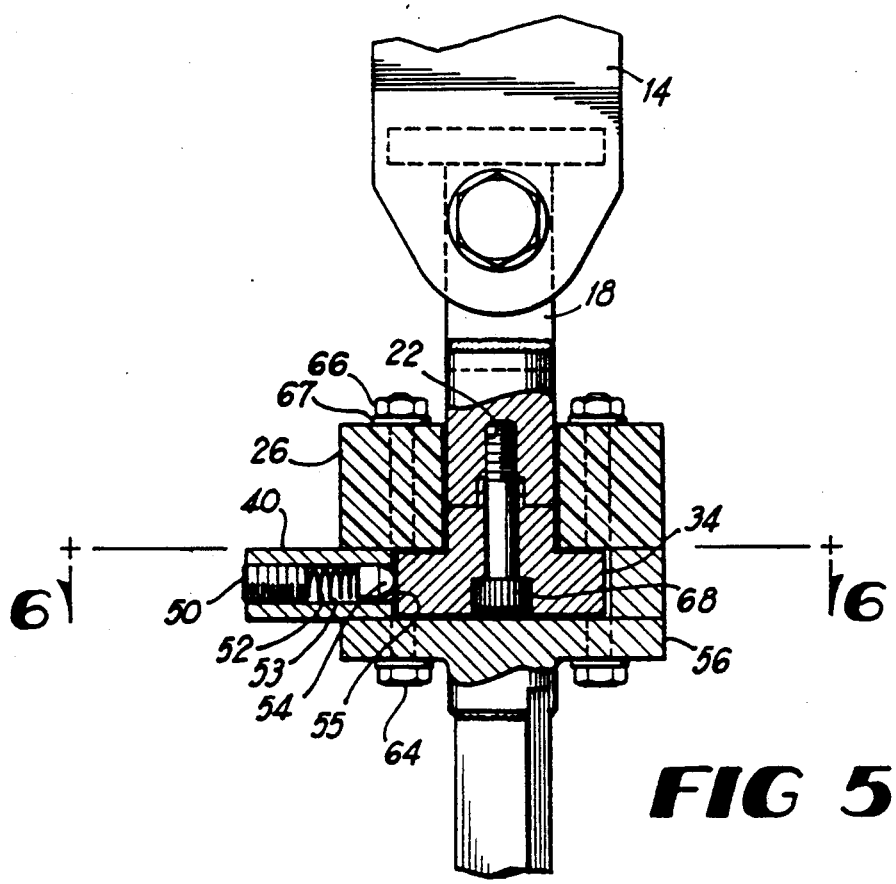
FIG. 5 is a side sectional view of the embodiment of FIG. 1 taken along line 5—5 of FIG. 2.
Figure 6:
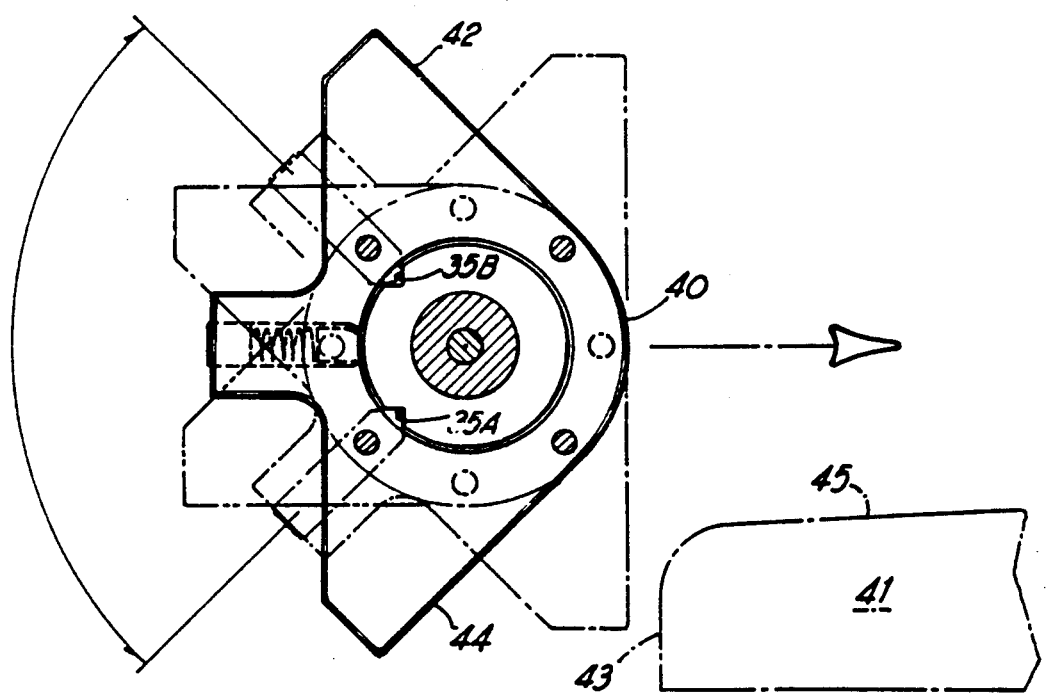
FIG. 6 is a top sectional plan view of the embodiment of FIG. 1 taken along line 6—6 of FIG. 5.

Referring now to FIGS. 4 through 6, shackle assembly 30 will be described in detail. A shackle shaft 18 extends through a cylindrical aperture 32 in cap 26 and is fixedly attached to a positional disk 34 by a screw 68. Screw 68 is screwed through an internally threaded opening 38 of positional disk 34 and into a threaded opening 22 of shackle shaft 18. A notch 36 of positional disk 34 fits into a recess 24 of shackle shaft 18 to form a locking, non-rotatable connection between positional disk 34 and shackle shaft 18, which are both stationary during operation. Aperture 32 of cap 26 is dimensioned to surround the lower end of shackle shaft 18 and a pin 39 of positional disk 34, forming a close-fitting, sliding relationship between rotatable cap 26 and stationary shackle shaft 18 and pin 39 of positional disk 34. The bottom surface of cap 26 is also in sliding contact with the top surface of positional disk 34. The sliding relationship between cap 26 and shackle shaft 18 and positional disk 34 is facilitated by forming cap 26 of a friction-reducing, self-lubricating material, as described above.

As best shown in FIG. 5, a cam plate 40 is positioned beneath cap 26 such that a cylindrical aperture 46 surrounds positional disk 34, forming a close-fitting, though not necessarily contacting relationship between the outer cylindrical surface of stationary positional disk 34 and the cylindrical surface of aperture 46 of rotatable cam plate 40. Preferably, the diameter of aperture 46 slightly exceeds the diameter of positional disk 34. Cam plate 40 is connected to cap 26 and a bottom plate 56. Bolts 64 are inserted through openings 57 of bottom plate 56, openings 48 of cam plate 40 and openings 28 of cap 26. Nuts 66 and washers 67 are then connected to the threaded ends of bolts 64, thereby allowing cap 26, cam plate 40 and bottom plate 56, to which shackle frame 60 is fixedly attached by welding or other conventional methods, to rotate in a fixed relationship to each other.

Cam plate 40 has a spring-loaded ball bearing 54 that extends partially through a small hole 55 in the side wall of aperture 46. Hole 55 has a diameter that is slightly smaller than the diameter of ball bearing 54 to prevent ball bearing 54 from extending completely through hole 55. The spring loading mechanism of cam plate 40 includes a helical spring 52 and a threaded screw 50 inserted into a threaded opening 53. Tension on the spring 52, and thereby on ball bearing 54, is adjustable via rotation of screw 50.

Ball bearing 54 engages the detents 35 formed in positional disk 34. When a shackle assembly 30 is in its original position, as represented by shackle assembly 30A, ball bearing 54 is positioned such that it engages and projects into detent 35A, as shown in FIG. 6. As the shackle assembly 30 advances into a partially rotated position, as represented by shackle assemblies 30B and 30C, ball bearing 54 rotates along the outer cylindrical surface of positional disk 34 between detents 35A and 35B. Upon the shackle assembly 30 reaching its fully rotated position, as represented by shackle assembly 30D, ball bearing 54 engages and projects into detent 35B. The engagement of ball bearing 54 into detents 35 of positional disk 34 serve to stabilize the angular position of the rotatable elements of shackle assembly 30 during operation.

As described above in connection with FIG. 2, the forward end 43 of cam member 41 is rounded and has a sufficient radius to disengage ball bearing 54 from detent 35A. The inner surface portion 45 of cam member 41 is tapered to gradually rotate ball bearing 54 into detent 35 so as not to overshoot the predetermined fully rotated position. Preferably, detents 35A and 35B are spaced apart in angular relation by 90°.

In accordance with another aspect of this invention, a second set of guide members 49 and a second cam member 41 (not shown) may be located at a point along shackle line 10 after rotary saw 33 to rotate each shackle assembly 30 back to its original position. This second cam member 41 is positioned under the opposite guide member 49 and essentially forms a mirror image of the first cam member 41. As cam plate 40, still in its fully rotated position, advances into contact with second cam member 41, a second cam plate surface 44 slides along cam member 41, causing ball bearing 54 to disengage from detent 35B. Upon cam plate 40 fully rotating back to its original position, ball bearing 41 re-engages detent 35A.

While the embodiment of shackle assembly 30 shown in FIGS. 4 through 6 is preferred, other configurations can also be advantageously employed. For example, shackle assembly 30 could include a torsion spring-loaded cam arm fixedly attached to the rotatable center shaft of shackle frame 62. The cam arm could be oriented such that when the cam arm contacted cam member 41, the shackle frame 62 would be rotated to a fully rotated position and remain in that position so long as the cam arm remained in contact with cam member 41. Upon the cam arm moving past the end of cam member 41, the spring mechanism would act to spring back the cam arm and shackle frame 62 to the original position. The shackle assembly 30 could further include a cam stop combination fixed to the rotatable shaft of the shackle frame 62 to prevent the shackle frame from rotating beyond the original position.

From the foregoing description, it will be apparent that there has been provided an improved automated poultry processing system utilizing a novel chicken hind quarter cutting stage. Various modifications to the preferred embodiments described herein may be apparent to those skilled in the art without departing from the scope of the present invention, which is only limited by the appended claims. Accordingly, the embodiments shown and described are only illustrative, not restrictive.

I claim:

1. Apparatus for cutting poultry hind quarters comprising:
   a treadmill;
   stationary, non-continuous shackle guides mounted on said treadmill;
   a stationary, non-continuous cam member mounted on said treadmill;

a plurality of moveable shackles mounted on said treadmill;

each said shackle including a rotatable shackle assembly for transporting poultry hind quarters;

said shackle assembly having a cam plate for rotating said shackle assembly from an original position into a rotated position when said cam plate contacts said cam member;

said shackle assembly having means for maintaining said shackle assembly in said original or rotated positions;

a cutting guide; and means for cutting chicken hind quarters;

said cutting guide positioning each poultry hind quarter while being cut by said cutting means.

2. Apparatus according to claim 1 wherein said shackle assembly is rotated 90° from an original position to a rotated position.

3. Apparatus according to claim 1 wherein said cam member further includes a rounded forward end and a tapered inner surface.

4. Apparatus according to claim 1 wherein said maintaining means includes:

an adjustable, spring-loaded ball bearing mounted in said cam plate; and a positional disk connected to a shaft of said shackle having a first detent corresponding to said original position of said shackle assembly and a second detent corresponding to said rotated position of said shackle assembly;

said ball bearing engaging said first detent when said shackle assembly is in said original position and engaging said second detent when said shackle assembly is in said rotated position.

5. Apparatus according to claim 1 wherein said shackle assembly include a circular cap for guiding said shackle assembly through said shackle guides.

6. Apparatus according to claim 5 wherein said cap, cam member and shackle guides are formed of a friction-reducing, self-lubricating material.

7. A method for cutting poultry hind quarters, comprising the steps of:

moving a moveable shackle connected to a treadmill into an original position;

said shackle including a rotatable shackle assembly for transporting chicken hind quarters;

said shackle assembly having means for maintaining said shackle assembly in said original position or a rotated position;

engaging said maintaining means in said original position;

advancing a cam plate of said shackle assembly into contact with a stationary cam member mounted on said treadmill;

disengaging said maintaining means from said original position;

rotating said shackle assembly from said original position into a rotated position;

engaging said maintaining means in said rotated position;

guiding each chicken hind quarter along a cutting guide; and cutting each chicken hind quarter using a saw.

8. A method according to claim 7, further comprising the step of rotating said shackle assembly 90° from an original position into a rotated position.

9. Apparatus for cutting poultry hind quarters comprising:

a treadmill;

first and second stationary cam members mounted on said treadmill;

a plurality of moveable shackles mounted on said treadmill;

each said shackle including a rotatable shackle assembly for transporting poultry hind quarters;

said shackle assembly having a cam plate for rotating said shackle assembly from an original position into a rotated position when said cam plate contacts said first cam member; and said cam plate causing said shackle assembly to rotate from a rotated position into an original position when said cam plate contacts said second cam member;

a cutting guide; and means for cutting chicken hind quarters;

said cutting guide positioning each poultry hind quarter while being cut by said cutting means.

10. Apparatus according to claim 9 wherein said shackle assembly is rotated 90° between an original position and a rotated position.

11. Apparatus according to claim 9 further comprising:

stationary, non-continuous shackle guides mounted on said treadmill;

first and second stationary, non-continuous cam members mounted on said treadmill; and said shackle assembly having means for maintaining said shackle assembly in said original or rotated positions.

12. Apparatus according to claim 11 wherein said first and second cam members further include a rounded forward end and a tapered inner surface.

13. Apparatus according to claim 11 wherein said maintaining means includes:

an adjustable, spring-loaded ball bearing mounted in said cam plate; and a positional disk connected to a shaft of said shackle having a first detent corresponding to said original position of said shackle assembly and a second detent corresponding to said rotated position of said shackle assembly;

said ball bearing engaging said first detent when said shackle assembly is in said original position and engaging said second detent when said shackle assembly is in said rotated position.

14. Apparatus according to claim 11 wherein said shackle assembly includes a circular cap for guiding said shackle assembly through said shackle guides.

15. Apparatus according to claim 14 wherein said cap, first and second cam members and shackle guides are formed of a friction-reducing, self-lubricating material.

16. A method for cutting poultry hind quarters, comprising the steps of:

moving a moveable shackle connected to a treadmill into an original position;

said shackle including a rotatable shackle assembly for transporting chicken hind quarters;

advancing a cam plate of said shackle assembly into contact with a first stationary cam member mounted on said treadmill;

rotating said shackle assembly from said original position into a rotated position;

guiding each chicken hind quarter along a cutting guide;

cutting each chicken hind quarter using a saw;

advancing said cam plate into contact with a second stationary cam member mounted on said treadmill; and rotating said shackle assembly into said original position.

17. A method according to claim 16 further comprising the step of rotating said shackle assembly 90° between an original position and a rotated position.

18. A method for cutting poultry hind quarters, comprising the steps of:

moving a moveable shackle connected to a treadmill into an original position;

said shackle including a rotatable shackle assembly for transporting chicken hind quarters;

said shackle assembly having means for maintaining said shackle assembly in said original position or rotated position;

engaging said maintaining means in said original position;

advancing a cam plate of said shackle assembly into contact with a first stationary cam member mounted on said treadmill;

disengaging said maintaining means from said original position;

rotating said shackle assembly from said original position into a rotated position;

engaging said maintaining means in said rotated position;

guiding each chicken hind quarter along a cutting guide;

cutting each chicken hind quarter using a saw;

advancing said cam plate into contact with a second stationary cam member mounted on said treadmill;

disengaging said maintaining means from said rotated position;

rotating said shackle assembly into said original position; and engaging said maintaining means in said original position.

* * * * *